United States Patent
Toi et al.

(10) Patent No.: US 8,573,953 B2
(45) Date of Patent: Nov. 5, 2013

(54) OIL PUMP MOUNTING STRUCTURE

(75) Inventors: Hiroomi Toi, Toyota (JP); Koichi Tanaka, Okazaki (JP); Yoshihiro Mizuno, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 198 days.

(21) Appl. No.: 13/203,925

(22) PCT Filed: Mar. 2, 2010

(86) PCT No.: PCT/JP2010/053714
§ 371 (c)(1),
(2), (4) Date: Aug. 30, 2011

(87) PCT Pub. No.: WO2010/101266
PCT Pub. Date: Sep. 10, 2010

(65) Prior Publication Data
US 2011/0315506 A1 Dec. 29, 2011

(30) Foreign Application Priority Data
Mar. 5, 2009 (JP) ................................. 2009-052136

(51) Int. Cl.
*F16H 57/04* (2010.01)
*F16H 57/00* (2012.01)
*F16H 7/00* (2006.01)

(52) U.S. Cl.
USPC .......................... 417/360; 417/362; 74/606 R

(58) Field of Classification Search
USPC .............. 417/360, 362; 477/37–50; 74/606 R
See application file for complete search history.

(56) References Cited

U.S. PATENT DOCUMENTS

| 4,306,841 A | * | 12/1981 | Morrison et al. | ............. 417/360 |
| 2004/0187811 A1 | * | 9/2004 | Yamada et al. | ............. 123/58.1 |
| 2006/0054413 A1 | * | 3/2006 | Nishiyama et al. | .......... 184/6.28 |

FOREIGN PATENT DOCUMENTS

| EP | 1 630 458 A2 | 8/2005 |
| JP | 2003-301929 A | 10/2003 |
| JP | 2007-198418 A | 8/2007 |
| JP | 2007198418 A | * 8/2007 |
| WO | 2006/123079 A2 | 11/2006 |

* cited by examiner

*Primary Examiner* — Peter J Bertheaud
*Assistant Examiner* — Dominick L Plakkoottam
(74) *Attorney, Agent, or Firm* — Sughrue Mion, PLLC

(57) ABSTRACT

A mounting structure for mounting a separate shaft type oil pump in a case of a transmission. The separate shaft type oil pump is driven by a shaft that is separate from and rotated in cooperation with a shaft arranged in a torque input route extending from an engine to the transmission to supply hydraulic oil to a transmission oil pressure control mechanism. The mounting structure includes a spacer coupler that fastens the oil pump to the transmission case. The spacer coupler includes a plurality of spacers that couple the oil pump and the transmission case. An oil passage is formed in the spacers of the spacer coupler to connect an oil pressure system, which includes the oil pressure control mechanism, and the oil pump. A manual shaft for operating the transmission is arranged in a clearance between the spacers of the spacer coupler.

7 Claims, 8 Drawing Sheets

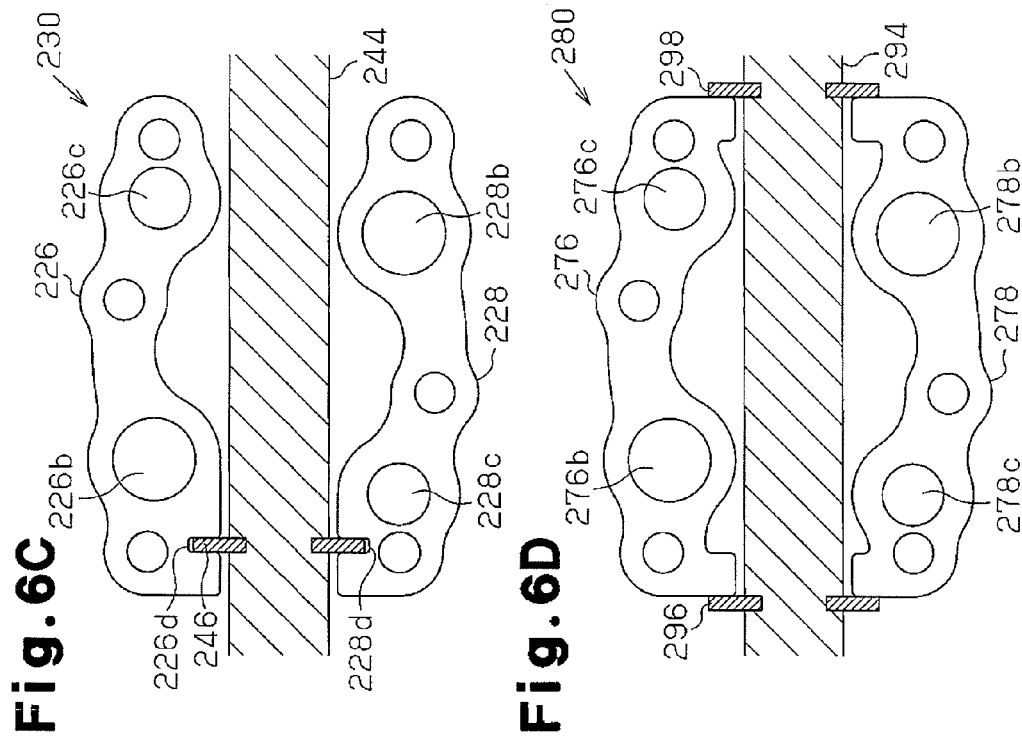
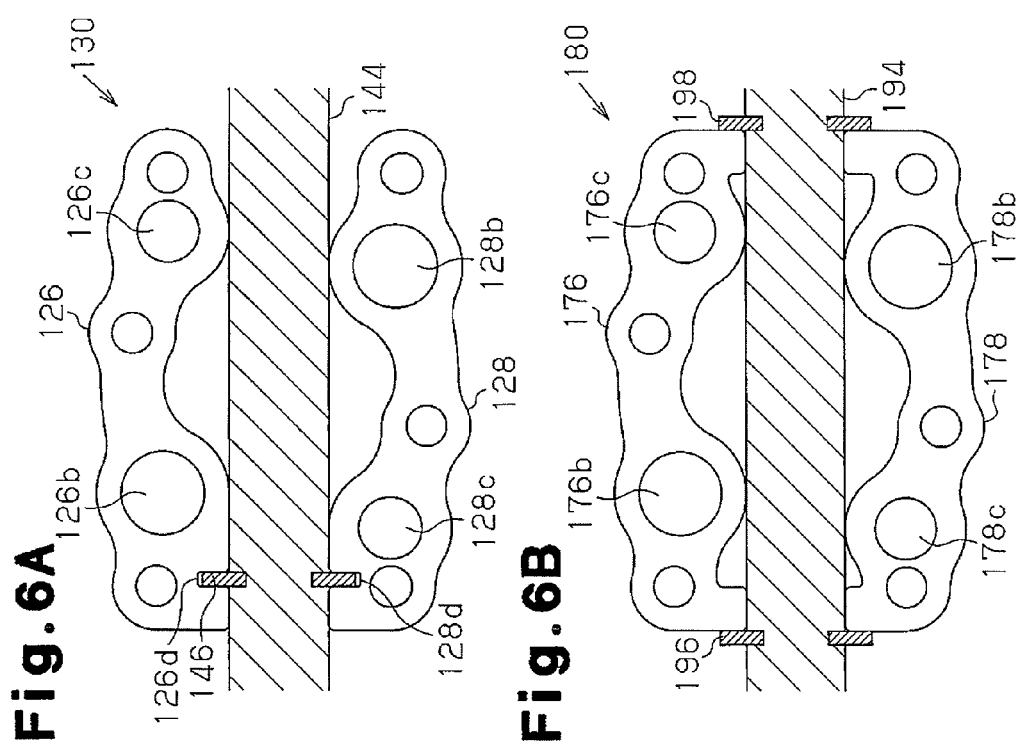

OIL PUMP MOUNTING STRUCTURE

CROSS REFERENCE TO RELATED APPLICATIONS

This application is a National Stage of International Application No. PCT/JP2010/053714 filed Mar. 2, 2010, claiming priority based on Japanese Patent Application No. 2009-052136 filed Mar. 5, 2009, the contents of all of which are incorporated herein by reference in their entirety.

FIELD OF THE INVENTION

The present invention relates to a structure for mounting a separate shaft type oil pump in a transmission case, in which a separate shaft type oil pump is driven by a shaft that is separate from and rotated in cooperation with a shaft arranged along a torque input route extending from an engine to a transmission.

BACKGROUND OF THE INVENTION

A transmission, such as an automatic transmission, includes a case, which houses an oil pump. The oil pump supplies hydraulic oil through an oil passage to an oil pressure control mechanism in the case. One type of such an oil pump is driven by torque received from a shaft (input shaft), which is located in a torque input route extending from the engine to the transmission. Another type of such an oil pump is driven and rotated by a shaft that is separate from and rotated in cooperation with the input shaft. Japanese Laid-Open Patent Publication Nos. 2003-301929 and 2007-198418 describe such a separate shaft type oil pump.

To avoid enlargement of the transmission case, the separate shaft type oil pump may be arranged in an area below a section between the input shaft and output shaft of the transmission. However, a manual shaft such as a parking control shaft may also be arranged in such an area. When the oil pump and the manual shaft are arranged in the same area, the transmission case must be enlarged downward so that the oil pump and the manual shaft do not interfere with each other. This increases the weight of the transmission and decreases the ground clearance of the transmission when installed in a vehicle.

To solve this problem, Japanese Laid-Open Patent Publication No. 2007-198418 inserts the manual shaft through a hole formed in a support wall, which supports the oil pump. A plate is arranged between the oil pump and the support wall so that an oil passage of the oil pump does not interfere with the hole of the support wall. A groove is formed in the surface of the plate. An oil passage connecting the oil pressure control mechanism and the oil pump is formed by guiding oil with the groove to a position at which interference does not occur.

Thus, the support wall, which is arranged in the case, must have a sufficient thickness to allow for the insertion of the manual shaft. Further, the plate must have a sufficient area to allow for the formation of the interference-prevention groove in its surface. Accordingly, the weight of the transmission case cannot be effectively decreased.

DISCLOSURE OF THE INVENTION

It is an object of the present invention to provide an oil pump mounting structure that allows for a separate shaft type oil pump and a manual shaft to be arranged in a transmission case in the same area without increasing the weight of the transmission case.

One aspect of the present invention is a mounting structure for mounting a separate shaft type oil pump in a case of a transmission. The separate shaft type oil pump is driven by a shaft that is separate from and rotated in cooperation with a shaft arranged along a torque input route extending from an engine to the transmission to supply hydraulic oil to a transmission oil pressure control mechanism. The mounting structure includes a spacer coupler that fastens the oil pump to the transmission case. The spacer coupler includes a plurality of spacers that couple the oil pump and the transmission case. An oil passage is formed in the spacers of the spacer coupler to connect an oil pressure system, which includes the oil pressure control mechanism, and the oil pump. A manual shaft for operating the transmission is arranged in a clearance between the spacers of the spacer coupler.

BRIEF DESCRIPTION OF THE DRAWINGS

FIGS. 6A to 6D are plan views showing spacer couplers and manual shafts according to a second embodiment of the present invention;

DETAILED DESCRIPTION OF THE PREFERRED EMBODIMENTS

A first embodiment of the present invention will now be discussed with reference to FIGS. 1 to 5B.

Figure 1:
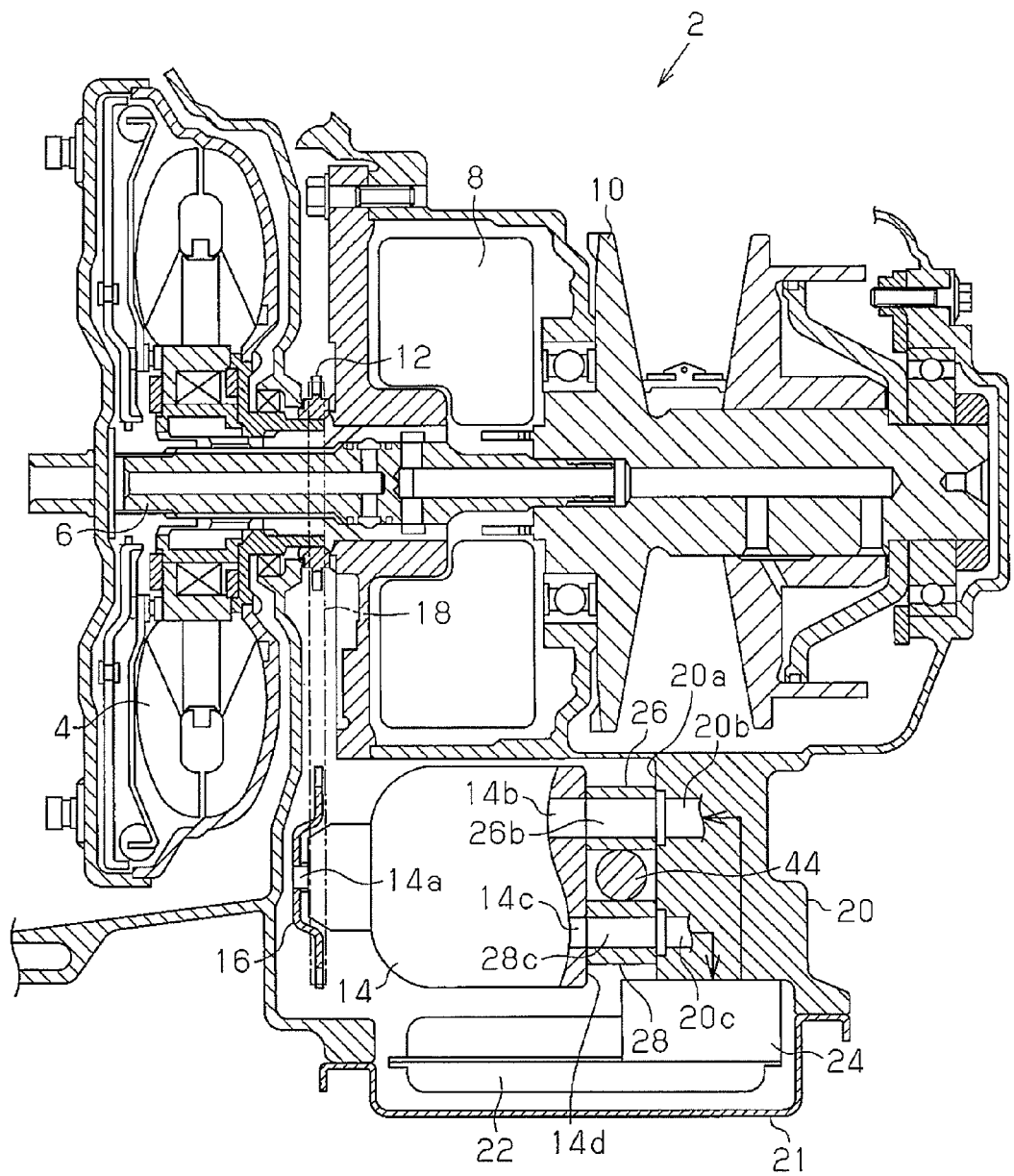
FIG. 1 is a cross-sectional diagram showing the main part of a vehicle belt type continuously variable transmission according to a first embodiment of the present invention.
Figure 2:
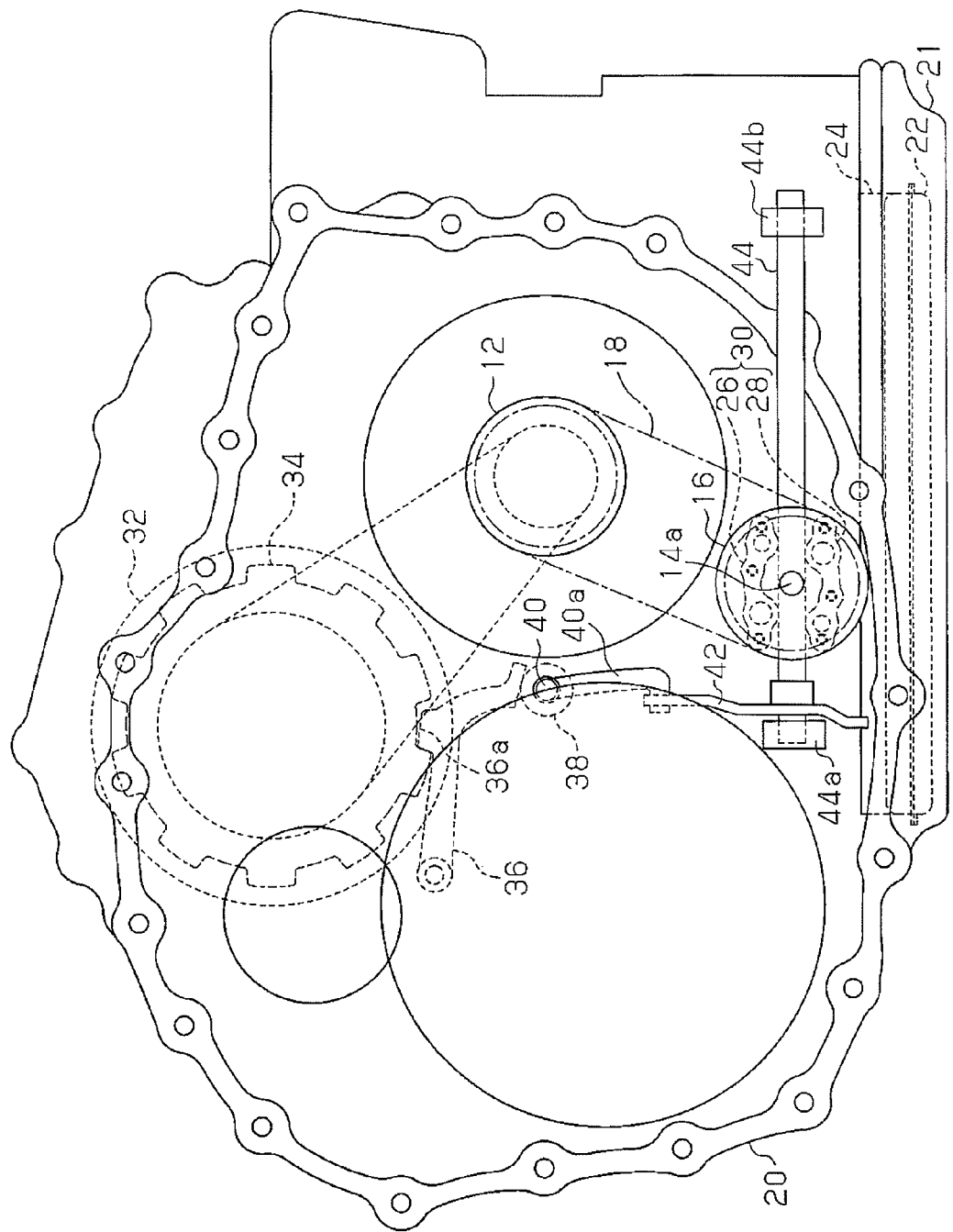
FIG. 2 is a schematic front view showing the periphery of a base for the vehicle belt type continuously variable transmission of FIG. 1 from a torque converter.
Figure 3:
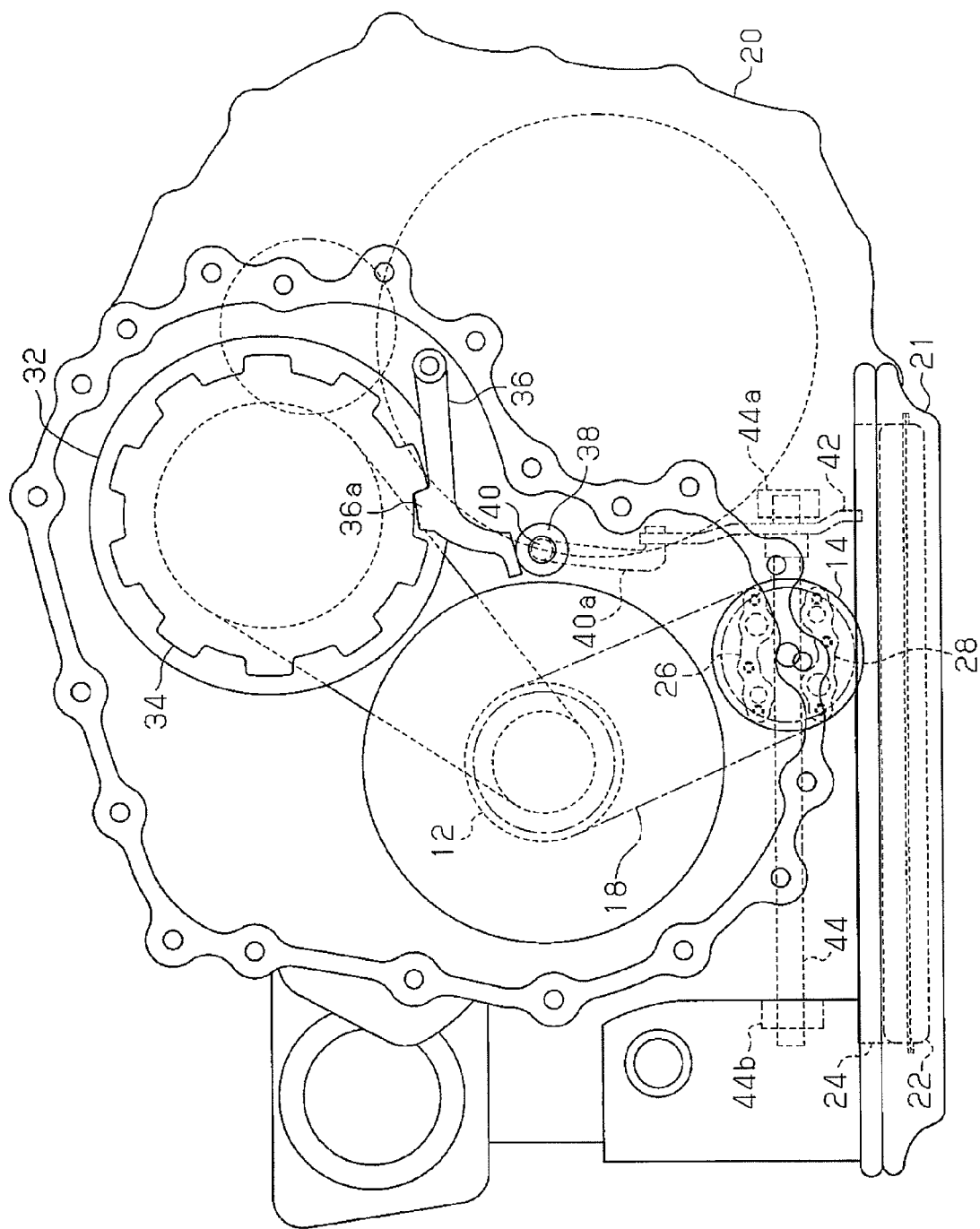
FIG. 3 is a rear view of FIG. 2.

FIG. 1 is a cross-sectional diagram showing the main part of a vehicle belt type continuously variable transmission 2, which serves as an automatic transmission embodying the present invention. FIG. 2 is a schematic front view showing the periphery of a base for the vehicle belt type continuously variable transmission 2 from a torque converter 4. FIG. 3 is a rear view of the belt type continuously variable transmission 2.

The belt type continuously variable transmission 2 includes an input shaft 6, a forward-reverse switching mechanism 8, and a belt type transmission mechanism 10. The input shaft 6 receives power from the engine through the torque converter 4. The input shaft 6 is located along a transmission route of the power (torque) received by the transmission 2 from the engine. The forward-reverse switching mechanism 8 switches the rotation direction of the power. The belt type transmission mechanism 10 varies the speed of the rotation produced by the engine and transmits torque accordingly to the drive wheels of the vehicle.

The input shaft 6 includes a drive sprocket 12, which is arranged between the torque converter 4 and the forward-reverse switching mechanism 8. A separate shaft type oil pump 14 includes a pump shaft 14a. A driven sprocket 16 is arranged on the pump shaft 14a. A chain 18 runs between the drive sprocket 12 and the driven sprocket 16. Thus, torque is transmitted by the chain 18 from the input shaft 6 to the driven sprocket 16, that is, the pump shaft 14a. When the input shaft 6 rotates, the pump shaft 14a rotates in cooperation with the input shaft 6 and drives the oil pump 14.

The belt type continuously variable transmission 2 includes a transmission case 20. The oil pump 14 is coupled to the transmission case 20 and fixed in the belt type continuously variable transmission 2. The oil pump 14 and the driven sprocket 16 are arranged at opposite sides of the transmission case 20. An oil pan 21 is arranged below the oil pump 14. An oil strainer 22 and a control valve unit 24, which is adjacent to the oil strainer 22, are arranged in the oil pan 21.

The oil pump 14 draws in hydraulic oil from the oil strainer 22 and discharges the hydraulic oil to the control valve unit 24. A plurality of electromagnetic valves and various sensors (oil temperature sensor, oil pressure sensor, etc.) are arranged in the control valve unit 24. An electronic controller, which is installed in the vehicle, regulates the discharge amount and discharge direction of the hydraulic oil in accordance with the operating state of the vehicle.

Figure 4A:
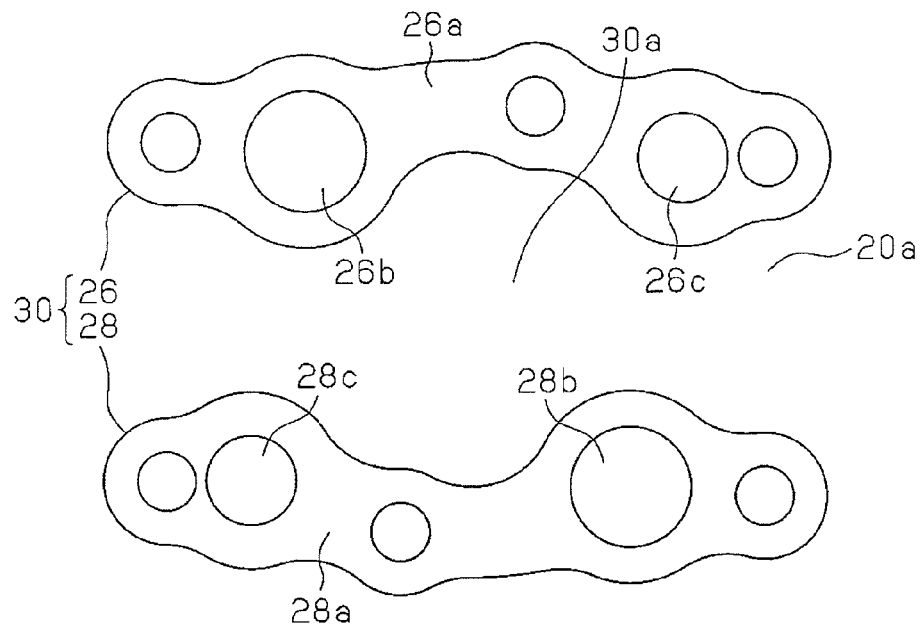
FIG. 4A is a plan view showing a spacer coupler of the vehicle belt type continuously variable transmission of FIG. 1.
Figure 4B:
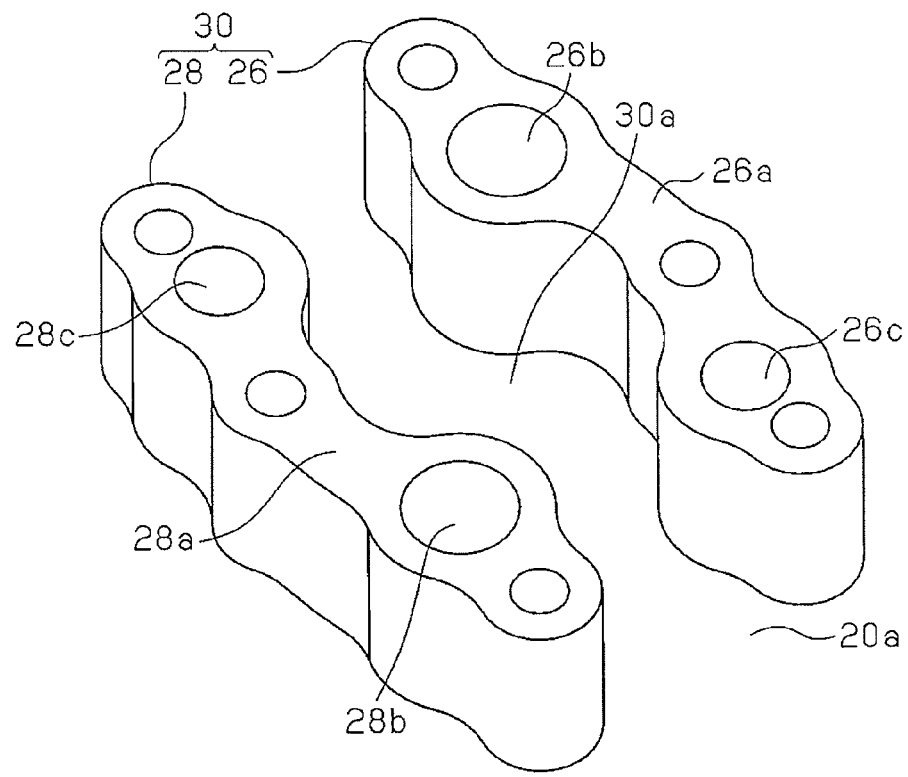
FIG. 4B is a perspective view showing the spacer coupler of FIG. 4A.

The oil pump 14 has a coupling surface 14d, which includes openings of an intake port 14b and a discharge port 14c. The transmission case 20 has a coupling surface 20a, which includes openings of oil passages 20b and 20c. The oil pump 14 and the transmission case 20 are not directly coupled to each other. A spacer coupler 30, which includes two spacers 26 and 28, is arranged between the oil pump 14 and the transmission case 20. In the present embodiment, the two spacers 26 and 28, which are identical in shape, are arranged on the coupling surface 20a, as shown in FIGS. 4A and 4B, and fastened by bolts to the transmission case 20.

Further, the spacers 26 and 28 respectively have distal surfaces 26a and 28a, which are fastened by bolts to the coupling surface 14d of the oil pump 14. This fixes the spacers 26 and 28 in the transmission case 20 as shown in FIGS. 1 to 3.

Bores extending through the spacers 26 and 28 form oil passages 26b, 26c, 28b, and 28c, which connect the oil passages 20b and 20c of the transmission case 20 with the intake port 14b and discharge port 14c of the oil pump 14. Further bores for insertion of fastening bolts extend through the spacers 26 and 28. This structure allows for oil circulation between the oil pump 14 and an oil pressure system, which includes the control valve unit 24.

When the oil pump 14 is driven, oil is drawn into the oil pump 14 from the oil pan 21 through the oil strainer 22, the oil passage 20b of the transmission case 20, the oil passages 26b and 28b of the spacers 26 and 28, and the intake port 14b of the oil pump 14. The oil pressurized by the oil pump 14 is supplied as hydraulic oil to the control valve unit 24 from the discharge port 14c of the oil pump 14 through the oil passages 26c and 28c of the spacers 26 and 28 and the oil passage 20c of the transmission case 20. The hydraulic oil is then supplied to various parts of the belt type continuously variable transmission 2 in accordance with the control of the controller.

The belt type continuously variable transmission 2 includes a parking mechanism. The parking mechanism includes a parking gear 34, a parking pawl 36, a cam 38, and a rod 40. The parking gear 34 is formed on a secondary pulley 32 of the belt type transmission mechanism 10. The parking pawl 36 engages the parking gear 34. The cam 38 drives the parking pawl 36. The rod 40 supports the cam 38 so that the cam 38 is movable in the axial direction.

The rod 40 has a basal portion 40a, which is bent and hook-shaped. The basal portion 40a is engaged with a detent plate 42. The detent plate 42 is supported by a manual shaft 44, which is arranged under the belt type continuously variable transmission 2, so that the axis of the detent plate 42 extends horizontally. The manual shaft 44 is rotatably supported by bearings 44a and 44b in the transmission case 20.

The manual shaft 44 corresponds to a parking control shaft. When the driver of the vehicle operates and rotates the manual shaft 44, the detent plate 42 oscillates in cooperation with the manual shaft 44. This moves the cam 38 in the axial direction with the rod 40, and the cam 38 lifts the distal end of the parking pawl 36. As a result, an engagement portion 36a of the parking pawl 36 engages the parking gear 34 thereby activating the parking function.

The manual shaft 44 is arranged in an extremely narrow area formed in a lower portion of the transmission case 20. More specifically, as shown in FIGS. 5A and 5B, the manual shaft 44 is inserted through a clearance 30a, which is formed between the two spacers 26 and 28 of the spacer coupler 30.

Figure 5A:
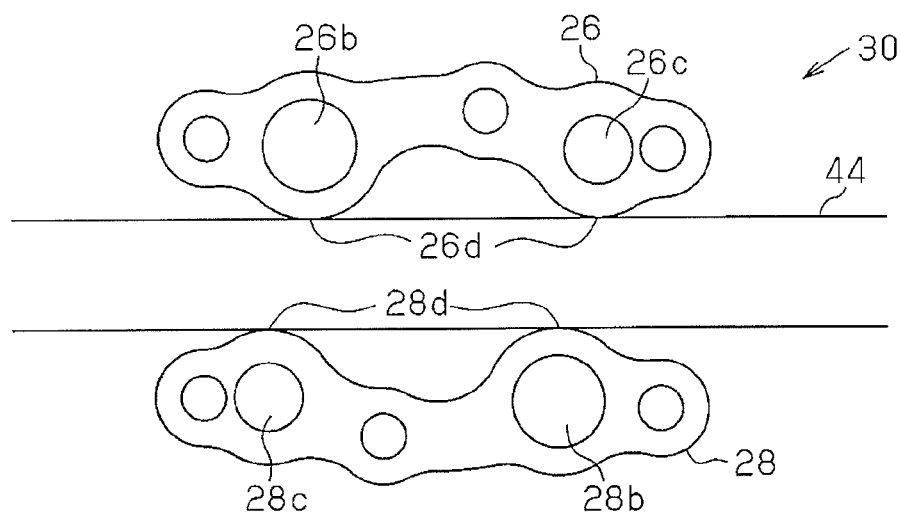
FIG. 5A is a front view showing the arrangement of the spacer coupler of FIGS. 4A and 4B and a manual shaft.
Figure 5B:
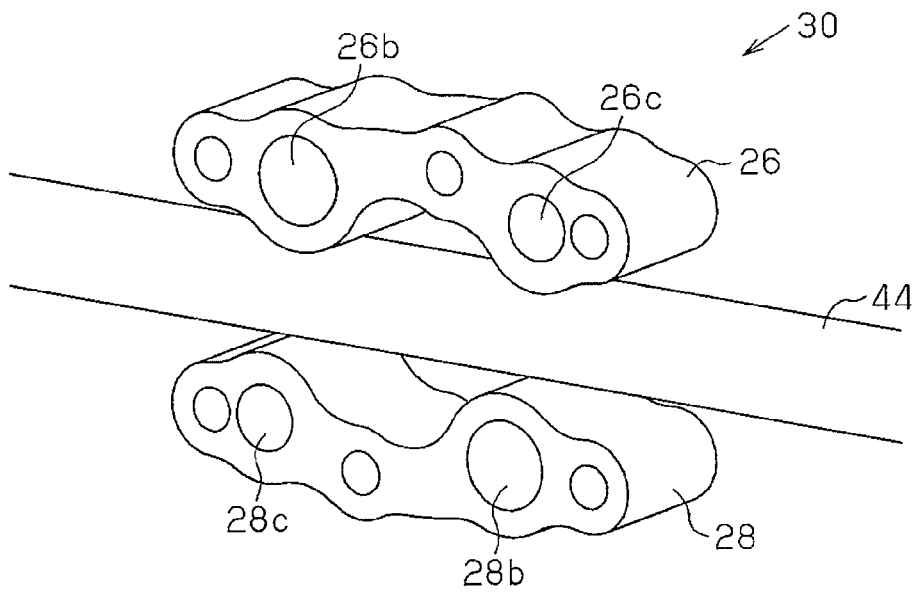
FIG. 5B is a perspective view showing the arrangement of the spacer coupler of FIGS. 4A and 4B and a manual shaft.

In the example of FIGS. 5A and 5B, the clearance 30a has a width that is substantially the same as the diameter of the manual shaft 44. Thus, the outer surface of the manual shaft 44 is in contact with the side surfaces 26d and 28d of the two spacers 26 and 28 even when the manual shaft 44 is slightly deflected. In other words, the two spacers 26 and 28 restrict deflection of the manual shaft 44.

The first embodiment has the advantages described below.

(1) The spacer coupler 30 including a plurality of spacers, namely, the two spacers 26 and 28, couples the oil pump 14 and the transmission case 20 so as to fix the oil pump 14 to the transmission case 20. The spacers 26 and 28 house the oil passages 26b, 26c, 28b, and 28c, which connect the oil pump 14 to the oil pressure system including the control valve unit 24, which is the oil pressure control mechanism. A manual shaft for operating the transmission, namely, the parking manual shaft 44, is arranged in the clearance 30a between the two spacers 26 and 28. Thus, the manual shaft 44 does not interfere with the oil pump 14 and the oil passages 26b, 26c, 28b, and 28c. Further, the transmission case 20 does not require a thick support plate through which the manual shaft 44 extends.

(2) As described above, the width of the clearance 30a between the two spacers 26 and 28 is set to be substantially the same as the diameter of the manual shaft 44. This results in the spacer coupler 30 functioning to restrict deflection of the manual shaft 44 in a direction orthogonal to its axis. As a result, there is no need for a separate deflection restriction structure in the transmission case 20, and the weight of the belt type continuously variable transmission 2 may thus be reduced.

In a second embodiment, as shown in FIGS. 6A to 6D, snap rings 146, 196, 198, 246, 296, and 298, which are arranged on manual shafts 144, 194, 244, and 294, are engaged with spacer couplers 130, 180, 230, and 280 to restrict axial movement of the manual shafts 144 to 294.

Referring to FIG. 6A, the snap ring 146 is fitted onto the manual shaft 144 to form a projection on the outer surface of the manual shaft 144. Two spacers 126 and 128 include grooves 126d and 128d, each formed in one of the ends of the corresponding spacer. The snap ring 146 is received in the grooves 126d and 128d. Further, in the same manner as the first embodiment, the two spacers 126 and 128 are separated from each other by a width that is substantially the same as the diameter of the manual shaft 144. As a result, the spacer coupler 130 allows for the oil pump to supply and discharge oil through the oil passages 126b, 126c, 128b, and 128c. Further, the manual shaft 144 is allowed to rotate about its axis. Abutment of the snap ring 146 against the side surfaces of the grooves 126d and 128d restrict axial movement of the manual shaft 144.

Referring to FIG. 6B, the two snap rings 196 and 198 are fitted onto the manual shaft 194. The snap rings 196 and 198 are in contact with two opposite sides of each of the two spacers 176 and 178. Further, in the same manner as the first embodiment, the two spacers 176 and 178 are separated from each other by a width that is substantially the same as the diameter of the manual shaft 194. As a result, the spacer coupler 180 allows for the oil pump to supply and discharge oil through the oil passages 176b, 176c, 178b, and 178c. Further, the manual shaft 194 is allowed to rotate about its axis, and axial movement of the manual shaft 194 is restricted.

In this manner, in the forms shown in FIGS. 6A and 6B, the manual shafts 144 and 194 are rotatably supported about their axes without the need for arranging bearings at other positions. Further, axial movement of the manual shafts 144 and 194 is restricted. The other parts are the same as the first embodiment. Thus, the forms of FIGS. 6A and 6B have the same advantages as the first embodiment. When bearings are additionally arranged at the two ends of each of the manual shafts 144 and 194, the manual shafts 144 and 194 are supported with further stability and deflection is further restricted in the manual shafts 144 and 194.

Referring to FIG. 6C, in the same manner as FIG. 6A, the snap ring 246 is fitted onto the manual shaft 244 and received in grooves 226d and 228d, each formed in one of the ends of a corresponding one of two spacers 226 and 228. The two spacers 226 and 228 differ from the first embodiment in that they are separated from each other by a width that is slightly greater than the diameter of the manual shaft 244. As a result, the spacer coupler 230 allows for the oil pump to supply and discharge oil through the oil passages 226b, 226c, 228b, and 228c. Further, the manual shaft 244 is allowed to rotate about its axis, and axial movement of the manual shaft 244 is restricted.

Referring to FIG. 6D, the snap rings 296 and 298 are fitted onto the manual shaft 294. The snap rings 296 and 298 are in contact with two opposite sides of each of two spacers 276 and 278. The two spacers 276 and 278 differ from the first embodiment in that they are separated from each other by a width that is slightly greater than the diameter of the manual shaft 294. As a result, the spacer coupler 280 allows for the oil pump to supply and discharge oil through the oil passages 276b, 276c, 278b, and 278c. Further, the manual shaft 294 is allowed to rotate about its axis, and axial movement of the manual shaft 294 is restricted.

In the forms of FIGS. 6C and 6D, to rotatably support the manual shafts 244 and 294, bearings must be arranged at positions separated from the spacer couplers 230 and 280. However, there is no need to restrict axial movement of the manual shafts 244 and 294. The other parts are the same as the first embodiment. Thus, the forms of FIGS. 6C and 6D also obtain advantage (1) of the first embodiment.

It should be apparent to those skilled in the art that the present invention may be embodied in many other specific forms without departing from the spirit or scope of the invention. Particularly, it should be understood that the present invention may be embodied in the following forms.

In each of the embodiments described above, the two spacers of the spacer coupler are formed discretely from the transmission case and the oil pump. Instead, the two spacers may be formed integrally with the coupling surface of the transmission case or the coupling surface of the oil pump. Alternatively, one of the spacers May be formed integrally with the coupling surface of the transmission case, and the other one of the spacers may be formed integrally with the coupling surface of the oil pump.

In each of the embodiments described above, for example, as shown in FIG. 1, the distance between the coupling surface 20a of the transmission case 20 and the coupling surface 14d of the oil pump 14 is greater than the diameter of the manual shaft 44. Instead, the distance may be substantially the same as the diameter of the manual shaft 44. This prevents deflection of the manual shaft 44 in the vertical direction and the horizontal direction.

Figure 7A:
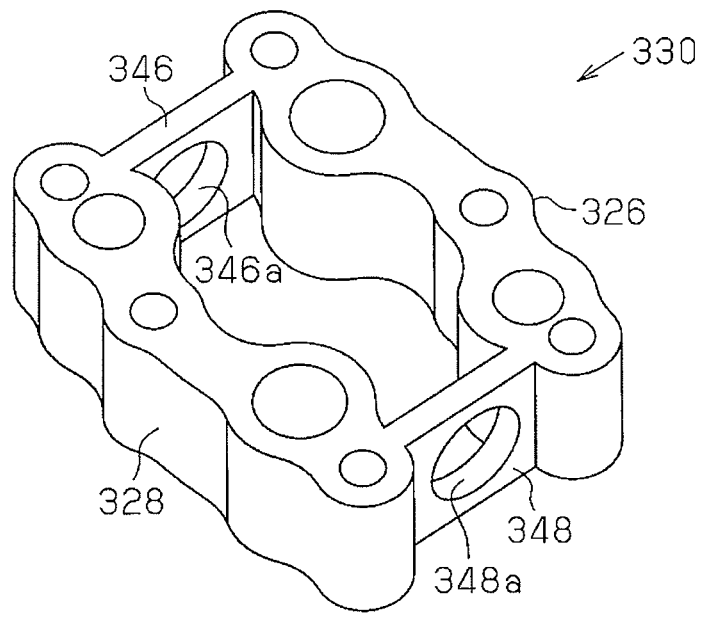
FIGS. 7A and 7B are perspective views showing further forms of the spacer coupler.
Figure 7B:
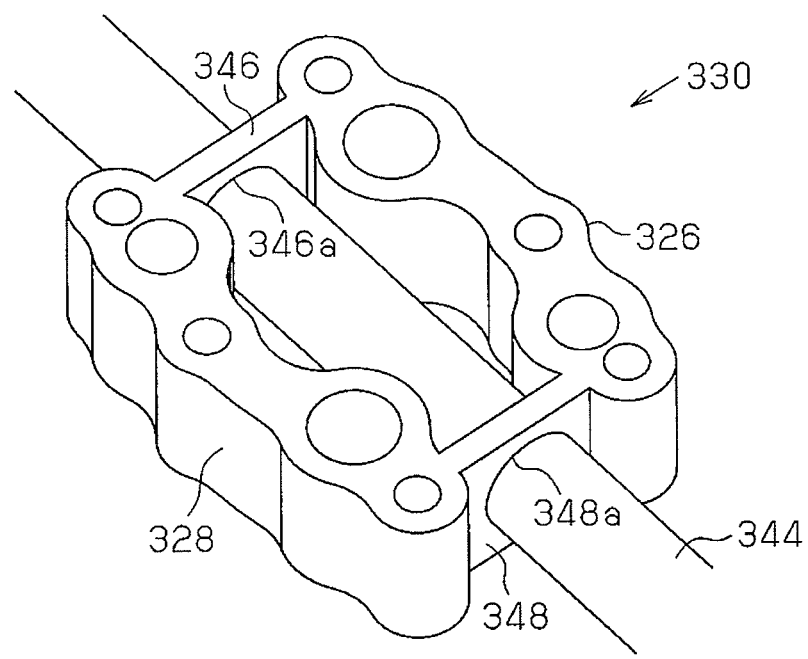

A spacer coupler as shown in FIG. 7A may be used. More specifically, a spacer coupler 330 includes two spacers 326 and 328. Connectors 346 and 348 connect the two ends of the spacers 326 and 328. The connectors 346 and 348 have holes 346a and 348a, the diameters of which are the same as a manual shaft 344. The spacer coupler 330 is arranged in the transmission case with the manual shaft 344 inserted through the holes 346a and 348a, as shown in the state of FIG. 7B. This eliminates the need for bearings to support the manual shaft 344. If bearings were to be used, deflection of the manual shaft in both the vertical and horizontal directions would be further effectively prevented.

Figure 8A:
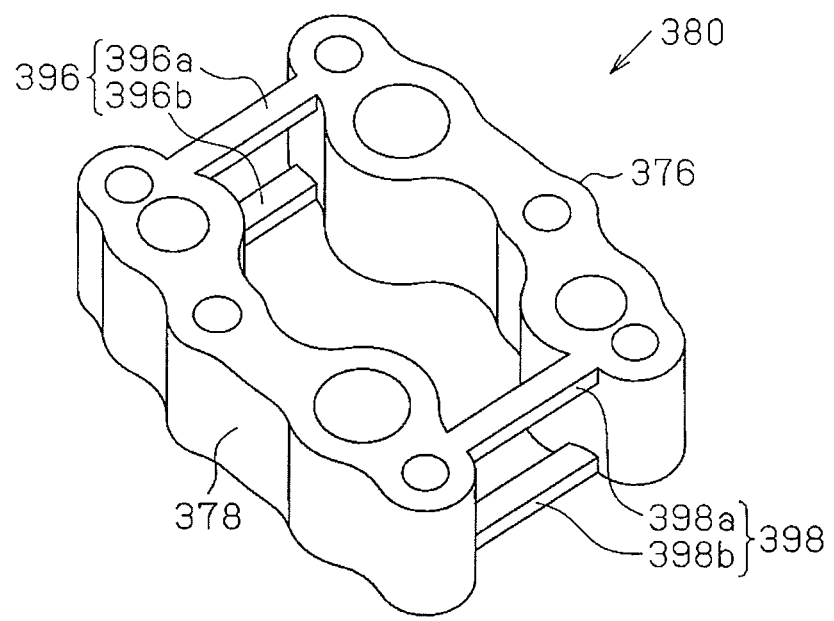
FIGS. 8A and 8B are perspective views showing other forms of the spacer coupler.
Figure 8B:
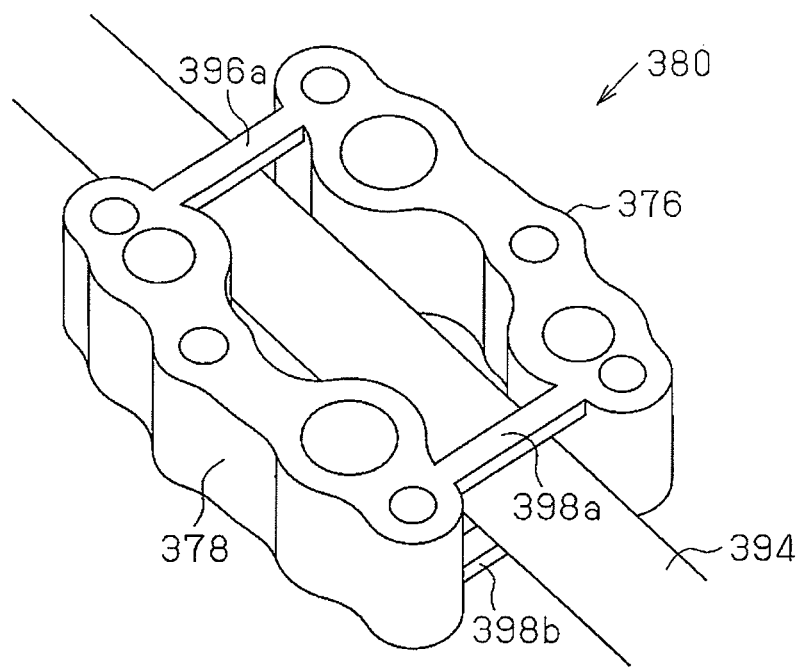

A spacer coupler as shown in FIG. 8A may be used. More specifically, a spacer coupler 380 includes two spacers 376 and 378. Connectors 396 and 398 connect the two ends of the spacers 376 and 378. The connector 396 includes a pair of parallel bridges 396a and 396b extending between spacers 376 and 378. The connector 398 includes a pair of parallel bridges 398a and 398b extending between spacers 376 and 378. The distance between the bridges 396a and 396b and the bridges 398a and 398b is substantially the same as the diameter of the manual shaft 394. The arrangement of the manual shaft 394 as shown in FIG. 8B eliminates the need for bearings. The spacers 376 and 378 and the connectors 396 and 398 prevent deflection of the manual shaft 394 in the vertical direction and the horizontal direction.

In each of the embodiments described above, the belt type continuously variable transmission is used as an example of a transmission. In other types of transmissions, when the mounting of a separate shaft type oil pump to a transmission case manual shaft results in interference of the manual shaft with the oil pump, a spacer coupler may also be arranged between the oil pump and the transmission case as described in the above embodiments. This allows for an arrangement of the manual shaft and oil pump that does not increase the weight of the transmission case.

The transmission is not limited to an automatic transmission. The present invention may be applied to a manual transmission in which a controller controls the control valve unit in accordance with the operation of buttons by the vehicle driver, and the transmission performs gear shifting in correspondence with the driver operation.

In each of the embodiments described above, the spacer coupler includes two spacers. Instead, the spacer coupler may include three or more spacers. Arrangement of a manual shaft in a clearance formed between these spacers allows for an arrangement of the manual shaft and oil pump that does not increase the weight of the transmission case.

The present examples and embodiments are to be considered as illustrative and not restrictive, and the invention is not to be limited to the details given herein, but may be modified within the scope and equivalence of the appended claims.

The invention claimed is:

1. A mounting structure for mounting a separate shaft type oil pump in a case of a transmission, wherein the separate shaft type oil pump is driven by a shaft that is separate from and rotated in cooperation with a shaft arranged along a torque input route extending from an engine to the transmission to supply hydraulic oil to a transmission oil pressure control mechanism, the mounting structure comprising:

a spacer coupler that fastens the oil pump to the transmission case, the spacer coupler including a plurality of spacers that couple the oil pump and the transmission case;

an oil passage formed in the spacers of the spacer coupler to connect an oil pressure system, which includes the oil pressure control mechanism, and the oil pump;

a manual shaft for operating the transmission, arranged in a clearance between the spacers of the spacer coupler; and wherein the spacers of the spacer coupler are separated from each other to form the clearance allowing for arrangement of the manual shaft between the spacers.

2. The mounting structure according to claim 1, wherein the transmission is a belt type continuously variable transmission.

3. The mounting structure according to claim 1, wherein the transmission is an automatic transmission.

4. The mounting structure according to claim 1, wherein the manual shaft is a parking control shaft.

5. The mounting structure according to claim 1, wherein each of the spacers of the spacer coupler includes a side surface that contacts, in an axial direction, a projection formed on an outer surface of the manual shaft to restrict axial movement of the manual shaft.

6. The mounting structure according to claim 1, wherein each of the spacers of the spacer coupler includes a side surface that contacts, in a direction orthogonal to an axial direction, an outer surface of the manual shaft to restrict deflection of the manual shaft in the direction orthogonal to the axial direction.

7. The mounting structure according to claim 1, wherein the manual shaft is arranged so that its axis extends horizontally, and the spacers of the spacer coupler are separated from each other in a vertical direction to form the clearance.

* * * * *